UNITED STATES PATENT OFFICE.

GILBERT RIGG, OF PALMERTON, PENNSYLVANIA, ASSIGNOR TO NEW JERSEY ZINC COMPANY, OF NEW YORK, N. Y., A CORPORATION OF NEW JERSEY.

MEANS FOR PROTECTING METALLIC SURFACES FROM CORROSION.

1,031,377.     Specification of Letters Patent.     Patented July 2, 1912.

No Drawing.     Application filed July 28, 1909. Serial No. 509,995.

*To all whom it may concern:*

Be it known that I, GILBERT RIGG, a subject of the King of Great Britain, residing at Palmerton, county of Carbon, and State of Pennsylvania, have invented certain new and useful Improvements in Means for Protecting Metallic Surfaces from Corrosion; and I do hereby declare the following to be a full, clear, and exact description of the invention, such as will enable others skilled in the art to which it appertains to make and use the same.

My invention relates to certain new and useful improvements in means for protecting metallic surfaces from corrosion, particularly surfaces of iron or steel.

The usual coat of paint can only protect iron or steel from corroding so long as it remains impervious to damp. As soon as moisture penetrates the paint layer corrosion of the metal will begin. To insure the exclusion of damp for a reasonable length of time, is exceedingly difficult, for the paint itself is liable to undergo changes, even if, at the time of its application, it fulfilled perfectly the conditions imposed.

The purpose of my present invention is to render penetrating damp harmless, by associating with the protecting paint material which will inhibit corrosion, namely, compounds of tungstic acid with bases (tungstates) soluble in the sense hereinafter pointed out, *i. e.* capable of yielding to water sufficient of its tungstic acid in the combined state to give protection against rust.

Some of the tungstates are freely soluble, others are almost insoluble, and there are still others having intermediate degrees of solubility, and they vary greatly in the relative proportions in which the tungstic acid and base are combined. Moreover, they may contain phosphorus, silicon or boron, giving rise to phospho-tungstates, silico-tungstates, and boro-tungstates; but the fundamental or generic constituent composition which they all present and which renders them available for the purposes of the present invention is tungstic acid in combination with a base.

My invention is based upon the discovery that, when a tungstate which is soluble in water is added to water to which iron or steel is exposed, very small quantities of the tungstate are sufficient to entirely prevent the rusting of the iron or steel. The metal retains its bright surface untarnished and the water remains clear and free from the reddish brown turbidity that is imparted to water by rusting iron. Thus, in the course of one series of experiments, I have found that, under conditions strongly favorable to rusting, 1 part of tungstic acid in the form of orthotungstate of soda, $Na_2WO_4 2 H_2O$, dissolved in 2000 parts of water was quite sufficient to keep the metal bright and stop all corrosion.

The tungstates of different bases vary greatly in their degree of solubility, tungstates of sodium and tungstates of magnesium for example, giving very soluble compounds, while tungstates of lead and tungstates of barium are among the most insoluble ones, and as hereinbefore stated, there exist many intermediate ones. The concentration of the salt necessary to protect the iron or steel from corrosion is so small, however, that a slight solubility is all that is necessary for the purpose, and consequently any tungstate will suffice provided it is capable of yielding to water sufficient of its tungstic acid in the combined state to give protection against rust; for which reason it will be understood that I do not desire to limit my invention only to the employment of those tungstates commonly included under the head of soluble tungstates.

In putting my invention into practice I add the tungstate to the paint (for instance, zinc oxid paint) intended for the priming coat for the iron or steel surface, a tungstate but slightly soluble (such as zinc tungstate being preferred in the proportion of say 5% to 10% of the weight of the priming coat paint, which proportion will be sufficient for general use, although it may be increased if desired. The priming coat should be carefully reinforced by other superjacent coats, so as to protect it from all water except such as might leak through the paint. Under these circumstances, the penetration of water to the priming coat would cause the tungstate to dissolve and become active as an anti-rust medium. The orthotungstate of zinc is particularly appropriate for admixture with zinc oxid paint, for the reason that it is white and, therefore, does not deteriorate the color. It can be ground in with the zinc oxid by paint grinders when preparing their paints for use.

Having thus described my invention, what I claim is:—

1. Means for preventing corrosion of metallic surfaces, comprising a rust preventing coating of paint containing as one of its ingredients a tungstate capable of yielding to water sufficient of its tungstic acid in the combined state to give protection against rust; substantially as described.

2. Means for preventing corrosion of metallic surfaces, comprising a rust preventing coating of paint containing as one of its ingredients a complex tungstate capable of yielding to water sufficient of its tungstic acid in the combined state to give protection against rust; substantially as described.

3. Means for preventing corrosion of metallic surfaces, comprising a rust preventing coating of paint containing as one of its ingredients an orthotungstate capable of yielding to water sufficient of its tungstic acid in the combined state to give protection against rust; substantially as described.

4. Means for preventing corrosion of metallic surfaces, comprising zinc oxid paint associated with a tungstate capable of yielding to water sufficient of its tungstic acid in the combined state to give protection against rust; substantially as described.

5. Means for preventing corrosion of metallic surfaces, comprising zinc oxid paint associated with a complex tungstate capable of yielding to water sufficient of its tungstic acid in the combined state to give protection against rust; substantially as described.

6. Means for preventing corrosion of metallic surfaces, comprising zinc oxid paint associated with an orthotungstate capable of yielding to water sufficient of its tungstic acid in combined state to give protection against rust; substantially as described.

7. Means for preventing corrosion of metallic surfaces, comprising zinc oxid paint associated with orthotungstate of zinc capable of yielding to water sufficient of its tungstic acid in the combined state to give protection against rust; substantially as described.

8. A paint containing as one of its ingredients orthotungstate of zinc; substantially as described.

In testimony whereof I affix my signature, in presence of two witnesses.

GILBERT RIGG.

Witnesses:
 FELIX LAYOT,
 E. G. TACY.

Copies of this patent may be obtained for five cents each, by addressing the "Commissioner of Patents, Washington, D. C."